2,950,218

PACKAGING FILM AND PROCESS FOR PREPARATION THEREOF

Edward Royals Covington and John Warren Meier, Madison, Tenn., assignors to E. I. du Pont de Nemours and Company, Wilmington, Del., a corporation of Delaware No Drawing. Filed July 23, 1957, Ser. No. 673,582

20 Claims. (Cl. 117—145)

This invention relates to coating compositions and particularly to coating compositions used to improve the properties of packaging materials.

The necessity of coating regenerated cellulose film, polyethylene terephthalate film, paper and the like to convert them into commercially acceptable packaging materials is well known. The coatings can make the material capable of adhering to itself by the application of heat, termed "heat sealing" by the art, so that the conversion to bags, containers, etc., is facilitated. The coatings can provide moisture-proofness, a property usually lacking in the base material. The coatings can impart printability to a surface that otherwise might display little ability to retain printing inks. The coatings can serve to improve the slip and matting properties of the base material, both properties indicating the ability of the surfaces to slide over each other for easy handling in a wrapping machine. However, no matter which surface property or properties the coating composition serves to improve, it is important that the composition adhere tenaciously to the base material and that the composition does not affect adversely the desirable properties such as flexibility, durability or transparency of the base material.

One of the most useful group of compositions which fulfills the above requirements are the vinylidene chloride copolymers. However, the level of properties, particularly heat-seal strength, matting and slip, obtained by the use of the vinylidene chloride copolymer compositions heretofore known to the art leave much room for improvement.

It is an object of the present invention to provide a vinylidene chloride copolymer coating composition which produces substantial improvements in the level of packaging film properties. It is a further object to provide such a coating composition which will adhere to and improve the properties of a variety of base materials ranging from thermoplastic polymeric materials (polyesters such as polyethylene terephthalate film) to the cellulosic materials (regenerated cellulose film), thus providing new and useful packaging materials. A still further object is to specify a process for preparing the new packaging films. Other objects will appear hereinafter.

The objects are accomplished by providing a base film having at least one surface coated with a coating composition comprising essentially a copolymer obtained from 80–96% vinylidene chloride, 2–19.5% of at least one other polymerizable mono-olefinic monomer copolymerizable therewith, preferably selected from the group consisting of an alkyl acrylate and acrylonitrile, and 0.5–7% of isopropenyl acetate.

Preferably, the coating composition comprises a copolymer obtained from 90–96% vinylidene chloride, 2–9.5% of at least one other polymerizable mono-olefinic monomer copolymerizable therewith, 0.5–7% of isopropenyl acetate and 0.5–2%, based on the combined weight of the previous components, of an unsaturated acidic component selected from the group consisting of maleic anhydride, acrylic acid, methacrylic acid and itaconic acid.

The invention will be more clearly understood by referring to the descriptive material and the examples which follow. Unless otherwise stated, all parts and percentages given in the examples are by weight. The examples, although illustrating specific embodiments of the present invention, should not be considered limitative.

For convenience, abbreviations will be used in the tables associated with the examples. $VCl_2$ represents vinylidene chloride; MA, methyl acrylate; IPA, isopropenyl acetate; MAA, methacrylic acid; EHA, 2-ethyl hexyl acrylate; AA, acrylic acid; MAn, maleic anhydride; and AN, acrylonitrile.

EXAMPLE I

The coating composition was prepared by adding a dispersing agent, vinylidene chloride, methyl acrylate, isopropenyl acetate, methacrylic acid and water to a vessel fitted with a reflux condenser. The dispersing agent was composed of equal amounts of "Duponol" WAQ[1], "Duponol" LSP[2], and "Sulframin" ABN[3]. After stirring this mixture to disperse the ingredients, a solution of ammonium persulfate and meta-sodium bisulfite in water was added to catalyze the reaction. The mixture was refluxed maintaining the temperature between 32° C. and 36° C. as polymerization progressed. The mixture was stirred until refluxing ceased, thereby indicating the completion of copolymerization. Upon completion of the reaction, a solution of "Duponol" LSP was added to stabilize the copolymer against coagulation. The resulting dispersion was cooled and discharged through a filter. The polymeric dispersion was composed of 50% solids. The ingredients used in the preparation are summarized below:

| | Parts | |
|---|---|---|
| Dispersing agent: | | |
| "Duponol" WAQ | 1.33 | |
| "Duponol" LSP | 1.33 | 4 |
| "Sulframin" ABN | 1.33 | |
| Vinylidene chloride | | 90 |
| Methyl acrylate | | 5 |
| Isopropenyl acetate | | 5 |
| Methacrylic acid | | 5 |
| Catalyzing agent: | | |
| Ammonium persulfate | 0.4 | 0.6 |
| Meta-sodium bisulfite | 0.2 | |
| Stabilizing agent "Duponol" LSP | | 1.2 |
| Water | | 108 |

The dispersion was then coated on a regenerated cellulose film approximately 0.001" thick which had been pretreated to contain 0.45% of a guanidine-urea-formaldehyde resin obtained by the reaction of guanidine nitrate, formaldehyde and urea as described in Example I of U.S. Patent No. 2,533,557 to Chapman. The coating was applied by passing the film through a coating bath containing the dispersion. Excess dispersion was doctored from the film surface. The coated film was then dried and tested. It had a coating weight, as dried, of 5.9 grams/square meter.

As a control, the regenerated cellulose film was coated in a similar manner with a composition containing all of the above ingredients except the 5 parts of isopropenyl acetate. The coating weight was 5.1 grams/square meter.

---
[1] Sodium lauryl sulfate.
[2] Sodium oleyl sulfate.
[3] Sodium dodecyl benzene sulfonate.

In the following table, Table 1, the properties of the two films are compared:

Table 1

| Film | Coating Composition | Percent by Weight | Heat-Seal Strength (gms./1.5 in.) | Slip | Matting | Anchorage |
| --- | --- | --- | --- | --- | --- | --- |
| Ex. I | VCl$_2$/MA/IPA/MAA | 90/5/5/0.5 | 240 | 1 | 3 | 1 |
| Control | VCl$_2$/MA/MAA | 94.7/5.3/0.5 | 0 | 3 | Blocked | 4 |

The details of the methods for testing the films follow:

Coating weight is determined for cellulosic film by soaking the coated film in a hot solution of a sodium alkyl aryl sulfonate in acetic acid and stripping the coating from the film. The stripped coating in the form of a thin film is dried and weighed. For polyethylene terephthalate base film, coating weight is determined by immersing a portion of the film in cyclohexanone at room temperature for 15 minutes or longer if necessary to dissolve the coating entirely; rinsing in ethyl acetate; and drying overnight at room temperature and 35% relative humidity. The sample is weighed before and after this treatment to determine the coating weight.

Heat-seal strength is measured by cutting a piece of the coated film 4" x 10" with the grain running in the long or machine direction into two pieces 4" x 5" each. The two pieces are superimposed so that opposite surfaces are in contact. The two pieces of superimposed film are then sealed together at each end at right angles to the grain. A ¾" wide sealing bar heated to a temperature of 125° C. at 20 p.s.i. pressure contacts the ends for ¼ second. The sealed sheets are then cut in half at right angles to the grain. From the center of the two resulting pieces, 1½" wide strips parallel to the grain are cut. The resulting four sets of strips are tested by opening each set of strips at the free ends, placing them in a Suter testing machine and pulling them apart. The highest force in grams required to pull the strips apart is taken as a measure of the heat-seal bond strength.

Slip is defined as the resistance or nonresistance of film to shearing action. It is determined by folding the sheet and applying maximum, uniform squeezing pressure on the folded sheet between the thumb and forefinger and immediately, without releasing the pressure, following this with a slow shearing movement of the thumb and forefinger. The sheets are graded as follows:

Grade 1: The surface slides smoothly over itself. Slip is excellent.

Grade 2: The surfaces slide jerkily over themselves, tending to jump or catch (usually at the beginning of the shearing movement). Slip is fair.

Grade 3: The surface does not slide over itself and the thumb and forefinger tend to slip first. Slip is poor.

Matting is defined as the tendency of a film to adhere when two or more surfaces are pressed together. A stack consisting of 30 to 32 3½" x 4" sheets of film, piled back to front throughout the stack is placed on a 3½" x 4" sheet of chipboard and covered with a similar square of chipboard. The assembly is placed on a smooth sheet of metal at least 1/16" thick and approximately 6" square. A lead weight with a smooth face (3½" x 4") weighing a total of 4.6 lbs. (⅓ lb. per sq. in.) is placed on top of the stack, and the entire assembly is placed in an oven maintained at 45° C. Care is exercised to prevent disturbing the uniform alignment of the sheets. The weighted sheets are held in the 45° C. oven for a minimum of 24 hours. The stacks are then carefully removed from the oven and allowed to cool to room temperature (30 minutes or more). The chipboard is removed and the stack of film sheets is grasped by thumb and forefinger in the center of the stack. A shearing force is then applied with care taken to avoid bending the stack or disturbing its edges, and the sheets are graded as follows:

Grade 1: The sheets slide apart individually with no tendency whatever to cling together.

Grade 1+: The sheets slide apart individually but with perceptible cling.

Grade 2: The stack separates into two or more groups of sheets which remain moderately firmly matted together.

Grade 2+: The stack separates on application of maximum force into two or more groups of sheets which are firmly matted together.

Grade 3: The stack cannot be separated by straight shearing force and can be separated only by peeling the sheets apart.

"Blocked": Matting is so poor that sheets become firmly cemented together and cannot be separated without damaging them.

Anchorage refers to the adhesion of the coating to the base film when in direct contact with water. Samples of coated film are suspended in water at 45° C. for 16 hours and then graded approximately as follows:

Grade 1—no blisters

Grade 2—few blisters

Grade 3—decided blistering

Grade 4—coating sloughs off at blistered or unblistered portions

EXAMPLE II

A coating composition was prepared using the monomers shown in Table 2 and a regenerated cellulose film was coated in a manner similar to that described in Example I with minor changes in the dispersing and stabilizing agents. The dispersing agent consisted of 1 part each of "Sulframin" ABN and "Duponol" LSP. The stabilizing agent consisted of 1.2 parts of "Duponol" WAQ and 0.3 part of "Daxad" 11.[1] The coating weight was 8 grams/square meter.

It was also attempted to prepare a coating without using isopropenyl acetate. The composition, however, coagulated during reaction and could not be applied to the film.

The composition of the polymer and the properties of the coated film are presented in the following table, Table 2:

[1] Sodium salt of naphthalene sulfonic acid condensed with formaldehyde.

Table 2

| Film | Coating Composition | Percent by Weight | Heat-Seal Strength (gms./1.5 in.) | Slip | Matting | Anchorage |
| --- | --- | --- | --- | --- | --- | --- |
| Ex. II | VCl$_2$/MA/AN/EHA/IPA/AA/MAn | 90/2.5/2.5/2.5/2.5/1/1 | 329 | 1 | 1 | 2 |
| Control | VCl$_2$/MA/AN/EHA/AA/MAn | 92.5/2.5/2.5/2.5/1/1 | Coagulated during reaction | | | |

EXAMPLE III

A coating composition was prepared using the monomers shown in Table 3 and a regenerated cellulose film was coated in a manner similar to that described in Example I with minor changes in the dispersing and stabilizing agents. The dispersing agent consisted of 1 part each of "Sulframin" ABN and "Duponol" LSP. The stabilizing agent consisted of 1 part "Duponol" WAQ, 0.2 part of "Daxad" 11, and 2 parts of "Sulframin" ABN. The coating weight was 5 grams/square meter.

It was also attempted to prepare a coating without using isopropenyl acetate. The composition, however, coagulated during reaction and could not be applied to the film.

The composition of the polymer and the properties of the coated film are presented in the following table, Table 3:

Table 3

| Film | Coating Composition | Percent by Weight | Heat-Seal Strength (gms./1.5 in.) | Slip | Matting | Anchorage |
|---|---|---|---|---|---|---|
| Ex. III | $VCl_2/MA/IPA/AA/MAA$ | 90/5/5/0.25/0.25 | 279 | 2 | 2 | 2 |
| Control | $VCl_2/MA/AA/MAA$ | 93.7/5.3/0.25/0.25 | Coagulated during reaction. | | | |

EXAMPLE IV

A coating composition was prepared using the monomers shown in Table 4 and a regenerated cellulose film was coated in a manner similar to that described in Example I with minor changes in the dispersing and stabilizing agents. The dispersing agent consisted of .66 part each of "Duponol" WAQ, "Sulframin" ABN and "Daxad" 11. The stabilizing agent consisted of 1 part "Duponol" WAQ, 2 parts "Sulframin" ABN and 0.2 part of "Daxad" 11. The coating weight was 6.2 grams/square meter.

As a control, regenerated cellulose film was coated with a composition prepared in an identical manner except that isopropenyl acetate was omitted. The coating weight was 4.7 grams/square meter and the dispersing agent contained 0.66 part "Duponol" LSP instead of 0.66 part "Daxad" 11. The polymer compositions and the properties of both coated films are presented in the following table, Table 4:

Table 4

| Film | Coating Composition | Percent by Weight | Heat-Seal Strength (gms./1.5 in.) | Slip | Matting | Anchorage |
|---|---|---|---|---|---|---|
| Ex. IV | $VCl_2/MA/AN/IPA/MAA$ | 94/3/3/1/1 | 378 | 1 | 2 | 1 |
| Control | $VCl_2/MA/AN/MAA$ | 95/3/3/1 | 10 | 3 | 3 | 3 |

EXAMPLE V

A coating composition was prepared using the monomers shown in Table 5 and a regenerated cellulose film was coated in a manner similar to that described in Example I with minor changes in the dispersing and stabilizing agents. The dispersing agent consisted of 1 part each of "Sulframin" ABN and "Duponol" LSP. The stabilizing agent consisted of 1.2 parts "Duponol" WAQ and 0.3 part of "Daxad" 11. The coating weight was 8.1 grams/square meter.

As a control, the film was coated with a composition prepared in an identical manner except that isopropenyl acetate was omitted. The coating weight was 5.3 grams/square meter. The polymer compositions and the properties of the coated films are presented in the following table, Table 5:

Table 5

| Film | Coating Composition | Percent by Weight | Heat-Seal Strength (gms./1.5 in.) | Slip | Matting | Anchorage |
|---|---|---|---|---|---|---|
| Ex. V | $VCl_2/MA/AN/EHA/IPA/AA/MAn$ | 92/2/2/2/2/1/1 | 427 | 2 | 1 | 2 |
| Control | $VCl_2/MA/AN/EHA/AA/MAn$ | 94/2/2/2/1/1 | 52 | 2 | 3 | 3 |

EXAMPLE VI

A coating composition was prepared using the monomers shown in Table 6 and a regenerated cellulose film was coated in a manner similar to that described in Example I with minor changes in the dispersing and stabilizing agents. The dispersing agent consisted of 1 part each of "Sulframin" ABN and "Duponol" LSP. The stabilizing agent consisted of 1 part "Duponol" WAQ, 2 parts "Sulframin" ABN and 0.2 part of "Daxad" 11. The coating weight was 5.6 grams/square meter.

As a control, the film was coated with a composition prepared in an identical manner except that isopropenyl acetate was omitted. The coating weight was 5.0 grams/square meter. The polymer compositions and the properties of the coated films are presented in the following table, Table 6:

Table 6

| Film | Coating Composition | Percent by Weight | Heat-Seal Strength (gms./1.5 in.) | Slip | Matting | Anchorage |
|---|---|---|---|---|---|---|
| Ex. VI | $VCl_2/MA/AN/EHA/IPA/AA$ | 92/2/2/2/2/1 | 329 | 1 | 1 | 2 |
| Control | $VCl_2/MA/AN/EHA/AA$ | 94/2/2/2/1 | 75 | 2 | 3 | 2 |

EXAMPLE VII

A coating composition was prepared using the monomers in the ratio shown in Table 7 and a regenerated cellulose film was coated in a manner similar to that described in Example I with minor changes in the dispersing and stabilizing agents. The dispersing agent consisted of .66 part each of "Sulframin" ABN, "Duponol" WAQ and "Daxad" 11. The stabilizing agent consisted of 1 part "Duponol" WAQ, 2 parts "Sulframin" ABN and 0.2 part of "Daxad" 11. The coating weight was 7.2 grams/square meter.

As a control, the film was coated with a composition prepared in an identical manner except that isopropenyl acetate was omitted. The coating weight was 6.8 grams/square meter. The polymer compositions and the properties of the coated films are presented in the following table, Table 7:

*Table 7*

| Film | Coating Composition | Percent by Weight | Heat-Seal Strength (gms./1.5 in.) | Slip | Matting | Anchorage |
|---|---|---|---|---|---|---|
| Ex. VII | VCl₂/MA/AN/EHA/IPA/MAA | 90/2.5/2.5/2.5/2.5/0.5 | 245 | 2 | 2 | 1 |
| Control | VCl₂/MA/AN/EHA/MAA | 92.5/2.5/2.5/2.5/0.5 | 0 | 2 | 3 | 3 |

EXAMPLE VIII

A coating composition was prepared using the monomers prepared in Table 8 and a regenerated cellulose film was coated in a manner similar to that described in Example I with minor changes in the dispersing and stabilizing agents. The dispersing agent consisted of .66 part each of "Sulframin" ABN, "Duponol" WAQ and "Daxad" 11. The stabilizing agent consisted of 1.2 parts each of "Duponol" WAQ and "Daxad" 11 and 0.3 part of "Duponol" LSP. The coating weight was 7.4 grams/square meter.

As a control, the film was coated with a composition prepared in an identical manner except that isopropenyl acetate was omitted. The coating weight was 3.8 grams/square meter. The polymer compositions and the properties of the coated films are presented in the following table, Table 8:

*Table 8*

| Film | Coating Composition | Percent by Weight | Heat-Seal Strength (gms./1.5 in.) | Slip | Matting | Anchorage |
|---|---|---|---|---|---|---|
| Ex. VIII | VCl₂/MA/AN/EHA/IPA/MAA | 92/2/2/2/2/0.5 | 214 | 1 | 1 | 1 |
| Control | VCl₂/MA/AN/EHA/MAA | 94/2/2/2/0.5 | 0 | 1 | 2 | 2 |

EXAMPLE IX

A coating composition was prepared using the monomers shown in Table 9 and a regenerated cellulose film was coated in a manner similar to that described in Example I with only a dispersing agent consisting of 1 part each of "Duponol" WAQ and "Duponol" LSP being used. The coating weight was 5.1 grams/square meter.

As a control, the film was coated with a composition prepared in an identical manner except that isopropenyl acetate was omitted. The coating weight was 5.0 grams/square meter. The polymer compositions and the properties of the coated films are presented in the following table, Table 9:

*Table 9*

| Film | Coating Composition | Percent by Weight | Heat-Seal Strength (gms./1.5 in.) | Slip | Matting | Anchorage |
|---|---|---|---|---|---|---|
| Ex. IX | VCl₂/AN/IPA/MAA | 90/5/5/0.5 | 261 | 1 | 2 | 1 |
| Control | VCl₂/AN/MAA | 94.7/5.3/0.5 | 0 | 1 | 2 | 2 |

EXAMPLE X

A coating composition was prepared using the monomers shown in Table 10 and a regenerated cellulose film was coated in a manner similar to that described in Example I with minor changes in the dispersing and stabilizing agents. The dispersing and stabilizing agents consisted of quantities identical to those mentioned in Example VIII above. The coating weight was 7.4 grams/square meter.

As a control, the film was coated with a composition prepared in an identical manner except that isopropenyl acetate was omitted. The coating weight was 5.6 grams/square meter. The polymer compositions and the properties of the coated films are presented in the following table, Table 10:

*Table 10*

| Film | Coating Composition | Percent by Weight | Heat-Seal Strength (gms./1.5 in.) | Slip | Matting | Anchorage |
|---|---|---|---|---|---|---|
| Ex. X | VCl₂/MA/AN/EHA/IPA/MAA | 92/2/2/2/2/1 | 230 | 1 | 2 | 1 |
| Control | VCl₂/MA/AN/EHA/MAA | 94/2/2/2/1 | 0 | 1 | 3 | 2 |

EXAMPLE XI

A coating composition was prepared using the monomers shown in Table 11 and a polyethylene terephthalate film 0.0005 inch thick was coated in a manner similar to that described in Example I and using the same quantities of dispersing and stabilizing agents as in Example I. The coating weight was 9.5 grams/square meter. The composition of the coating polymer and the properties of the coated film are presented in the following table, Table 11.

*Table 11*

| Film | Coating Composition | Percent by Weight | Heat-Seal Strength (gms./1.5 in.) | Slip | Matting | Anchorage |
|---|---|---|---|---|---|---|
| Ex. XI | VCl$_2$/MA/IPA/MAA | 90/5/5/0.5 | 180 | 1 | 1 | 1 |

EXAMPLE XII

A coating composition was prepared using the monomers shown in Table 12 and glassine paper 0.0012 inch thick was coated in a manner similar to that described in Example I and using the same quantities of dispersing and stabilizing agents as in Example I. The coating weight was 6.5 grams/square meter.

The composition of the coating polymer and the properties of the coated film are presented in the following table, Table 12.

*Table 12*

| Film | Coating Composition | Percent by Weight | Heat-Seal Strength (gms./1.5 in.) | Slip | Matting | Anchorage |
|---|---|---|---|---|---|---|
| Ex. XII | VCl$_2$/MA/IPA/MAA | 90/5/5/0.5 | 175 | 1 | 1 | 1 |

From the foregoing examples it is evident that a wide variety of ingredients may enter the preparation of the films. The films may or may not be resin-impregnated. To obtain increased anchorage at high relative humidities, films sensitive to water vapor may be pretreated with anchoring resins, such as those disclosed in U.S. Patents 2,159,007, 2,280,829, 2,432,542, 2,533,557, and 2,546,575. The films, particularly regenerated cellulose film, may contain softeners or other constituents such as pigments, dyes, delusterants, plasticizers, etc. if desired. The important concept here and the one basic to this invention resides in the use of a critical coating comprising a copolymer obtained from 80–96% by weight of vinylidene chloride, 2–19.5% by weight of a polymerizable monomer and 0.5–7% by weight of isopropenyl acetate.

As polymerizable monomers for use with the vinylidene chloride and isopropenyl acetate in the coating, I have illustrated the use of alkyl acrylates an acrylonitrile. However, the invention is not limited to these. Any of the following may be used: methyl, ethyl, isobutyl, butyl, acetyl and 2-ethylhexyl acrylates and methacrylates; phenyl methacrylate, cyclohexyl methacrylate, p-cyclohexylphenyl methacrylate, methoxyethyl methacrylate, glycidyl methacrylate, chloroethyl methacrylate, 2-nitro-2-methyl-propylmethacrylate, and the corresponding esters of acrylic acid; methyl alpha-chloroacrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, methylene diethyl malonate, acrylamide, methacrylamide or monoalkyl substitution products thereof, phenyl vinyl ketone, diethyl fumarate, diethyl maleate, methylene diethyl malonate, dichlorovinylidene fluoride, dimethyl itaconate, diethyl itaconate, dibutyl itaconate, vinyl pyridine, maleic anhydride, allyl glycidyl ether and other unsaturated aliphatic ethers described in U.S. Patent 2,160,943. These compounds may be described as vinyl or vinylidene compounds having a single CH$_2$=C< group. The most useful ones fall within the general formula

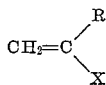

where R may be hydrogen, a halogen or a saturated aliphatic radical and X is selected from one of the following groups: —Cl, —Br, —F, —CN, —C$_6$H$_5$, —COOH,

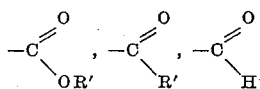

—OC$_6$H$_5$, —CONH$_2$, —CONH—R′, and —CONR′$_2$, in which R′ is alkyl.

The coatings may be applied in the form of aqueous dispersions as in the examples or from solutions of the polymers in organic solvents. Unsaturated aliphatic acidic components such as itaconic acid, acrylic acid, methacrylic acid and maleic anhydride are advantageously added to the coating compositions in either aqueous dispersions or organic solutions. However, the acids may be omitted from these compositions with little deleterious effect. It should be pointed out that films coated with compositions that do not include the unsaturated acidic components are inferior in anchorage and adhesion. For this reason, it is preferred to include an unsaturated acidic component in the coating compositions.

The coatings may be applied in accordance with any known coating techniques. They may be applied by passing the film through baths in a continuous manner or in a batch manner. Coatings may also be sprayed onto the film, or applied manually by brushing or the like. The thickness of the coatings may be adjusted in accordance with methods well known in the coating art.

The preferred base material for use in this invention is regenerated cellulose film. Other base materials which may be used in the invention include those shown in Examples XI and XII, polyethylene terephthalate film and paper. Films of cellulose acetate, cellulose propionate, cellulose acetate-butyrate, ethyl cellulose, hydroxyethyl cellulose, hydroxypropyl cellulose, carboxymethyl cellulose, etc. may also be improved by the present invention.

The materials of this invention are used advantageously as packaging materials for foods, cigarettes and the like. They provide flexible, strong materials that, due to improved heat-seal strength, slip and matting, can be easily converted to packages. This coating does not detract from the transparency of the base material and surprisingly, provides excellent non-fogging characteristics. Because of these superior properties the present films are outstanding as a vacuum and pressure packaging material, e.g., for packaging of luncheon meats, cheese, nuts, etc.

As many widely different embodiments can be made without departing from the scope of our invention, it is understood that the invention is not limited except as defined in the appended claims.

Having fully disclosed our invention, we claim:

1. A packaging material comprising a base sheet having at least one surface coated with a composition comprising essentially a copolymer obtained from 80–96% by weight of vinylidene chloride, 0.5–7% by weight of isopropenyl acetate and 2–19.5% by weight of at least one other polymerizable mono-olefinic monomer copolymerizable with vinylidene chloride selected from the group consisting of alkyl acrylate and acrylonitrile.

2. A packaging material as in claim 1 wherein the base sheet is a film of regenerated cellulose.

3. A packaging material as in claim 1 wherein the base sheet is a film of polyethylene terephthalate.

4. A packaging material as in claim 1 wherein the polymerizable mono-olefinic monomer is acrylonitrile.

5. A packaging material as in claim 1 wherein the polymerizable mono-olefinic monomer is alkyl acrylate.

6. A packaging material as in claim 1 wherein the polymerizable mono-olefinic monomer is methyl acrylate.

7. A packaging material comprising a base sheet having at least one surface coated with a composition comprising essentially a copolymer obtained from 90–96% by weight of vinylidene chloride, 0.5–7% by weight of isopropenyl acetate, 2–9.5% by weight of at least one other polymerizable mono-olefinic monomer copolymerizable with vinylidene chloride selected from the group consisting of alkyl acrylate and acrylonitrile and 0.5–2%, based on the combined weight of the previous components, of an unsaturated component selected from the group consisting of maleic anhydride, acrylic acid, methacrylic acid and itaconic acid.

8. A packaging material as in claim 7 wherein the base sheet is a film of regenerated cellulose.

9. A packaging material as in claim 7 wherein the base sheet is a film of polyethylene terephthalate.

10. A packaging material as in claim 7 wherein the polymerizable mono-olefinic monomer is acrylonitrile.

11. A packaging material as in claim 7 wherein the polymerizable mono-olefinic monomer is alkyl acrylate.

12. A packaging material as in claim 7 wherein the polymerizable mono-olefinic monomer is methyl acrylate.

13. A process for preparing a packaging film which comprises coating a base sheet with an aqueous dispersion containing a copolymer obtained from 80–96% by weight of vinylidene chloride, 0.5–7% by weight of isopropenyl acetate and 2–19.5% by weight of at least one other polymerizable mono-olefinic monomer copolymerizable with vinylidene chloride selected from the group consisting of alkyl acrylate and acrylonitrile; and drying the coated base sheet.

14. A process as in claim 13 wherein the base sheet is a film of regenerated cellulose.

15. A process for preparing a packaging film which comprises coating a base sheet with an aqueous dispersion containing a copolymer obtained from 90–96% by weight of vinylidene chloride, 0.5–7% by weight of isopropenyl acetate, 2–9.5% by weight of at least one other polymerizable mono-olefinic monomer copolymerizable with vinylidene chloride selected from the group consisting of alkyl acrylate and acrylonitrile and 0.5–2%, based on the combined weight of the previous components, of an unsaturated component selected from the group consisting of maleic anhydride, acrylic acid, methacrylic acid and itaconic acid; and drying the coated base sheet.

16. A process as in claim 15 wherein the base sheet is a film of regenerated cellulose.

17. A packaging material comprising a regenerated cellulose film having at least one surface coated with a composition comprising essentially a copolymer obtained from 80–96% by weight of vinylidene chloride, 0.5–7% by weight of isopropenyl acetate and 2–19.5% by weight of methyl acrylate.

18. A packaging material comprising a regenerated cellulose film having at least one surface coated with a composition comprising essentially a copolymer obtained from 90–96% by weight of vinylidene chloride, 0.5–7% by weight of isopropenyl acetate, 2–9.5% by weight of methyl acrylate and 0.5–2%, based on the combined weight of the previous components, of an unsaturated component selected from the group consisting of maleic anhydride, acrylic acid, methacrylic acid and itaconic acid.

19. A process for preparing a packaging film which comprises coating a regenerated cellulose film with an aqueous dispersion containing a copolymer obtained from 80–96% by weight of vinylidene chloride, 0.5–7% by weight of isopropenyl acetate and 2–19.5% by weight of methyl acrylate; and drying the coated film.

20. A process for preparing a packaging film which comprises coating a regenerated cellulose film with an aqueous dispersion containing a copolymer obtained from 90–96% by weight of vinylidene chloride, 0.5–7% by weight of isopropenyl acetate, 2–9.5% by weight of methyl acrylate and 0.5–2%, based on the combined weight of the previous components, of an unsaturated component selected from the group consisting of maleic anhydride, acrylic acid, methacrylic acid and itaconic acid; and drying the coated film.

References Cited in the file of this patent

UNITED STATES PATENTS

| | | |
|---|---|---|
| 2,762,720 | Michel | Sept. 11, 1956 |
| 2,829,069 | Michel | Apr. 1, 1958 |
| 2,843,572 | Wooten et al. | July 15, 1958 |

FOREIGN PATENTS

| | | |
|---|---|---|
| 654,342 | Great Britain | June 13, 1951 |
| 665,479 | Great Britain | Jan. 23, 1952 |